United States Patent [19]

Mochizuki et al.

[11] 4,000,321
[45] Dec. 28, 1976

[54] PROCESS FOR THE PREPARATION OF CHEWING GUM

[75] Inventors: Keizo Mochizuki, Kawasaki; Fumio Yokomichi, Yokohama, both of Japan

[73] Assignee: Meiji Seika Kaisha, Ltd., Japan

[22] Filed: May 8, 1975

[21] Appl. No.: 575,522

[30] Foreign Application Priority Data

May 17, 1974 Japan .................. 49-54586

[52] U.S. Cl. .................. 426/5; 426/3
[51] Int. Cl.² .................. A23G 3/30; A23G 3/00
[58] Field of Search .................. 426/3–6

[56] References Cited

UNITED STATES PATENTS

| | | | |
|---|---|---|---|
| 2,290,120 | 7/1942 | Thomas | 426/3 |
| 2,973,273 | 2/1961 | Curtiss | 426/5 |
| 3,020,164 | 2/1962 | Forkner | 426/5 |
| 3,205,075 | 9/1965 | Heggie et al. | 426/5 |
| 3,632,358 | 1/1972 | Echeandia | 426/3 |

*Primary Examiner*—Jeanette M. Hunter
*Attorney, Agent, or Firm*—McGlew and Tuttle

[57] ABSTRACT

A process for the preparation of chewing gum, comprises the steps of:
  forming a chewing gum composition by mixing a chewing gum base with sweeteners, flavorings, and colorants in accordance with the desired taste and appearance characteristics desired;
  cooling the chewing gum composition to a temperature of at least below −15° C;
  crushing or grinding the refrigerated composition to obtain minute fragments or finely ground pieces of the composition; and
  heating the minute fragments to cause them to adhere together, and to form an integrated chewing gum element thereof.

16 Claims, No Drawings

PROCESS FOR THE PREPARATION OF CHEWING GUM

BACKGROUND OF THE INVENTION

1. Field of the Invention

This invention relates in general to the preparation of chewing gum and, in particular, to a new and useful method of preparing chewing gum wherein a chewing gum composition is cooled to a temperature below −15° C and it is crushed or ground to form minute fragments and the fragments are subsequently warmed to cause them to adhere into a chewing gum unit.

2. Description of the Prior Art

The present invention is particularly related to a process for preparing chewing gum which is light in weight and low in specific gravity and which exhibits a soft chewing impression when it is chewed. Many processes are known for preparing chewing gum which is lightweight and low in specific gravity and which give a soft chewing impression when chewed, including one in which foaming agents are added to a chewing gum composition in the presence of water, and it is heated to temperatures in the range of from 110° C to 160° C. This method tends to harm the desired flavor and taste of the chewing gum products. In another method, for preparing aerated chewing gum, a foaming agent and a gelatine are used as mixing agents with a chewing gum base which is foamed. The disadvantage of this method is that the foaming agents and gelatine make it difficult to obtain chewing gum having a good flavor and taste. In addition, these methods both have the disadvantage that in order to obtain a desired fixed homogeneous texture of the products, the foaming conditions must be controlled very accurately by maintaining operating conditions such as temperature, etc., at a precise level, and this renders the quality control difficult.

A still further method provides chewing gum of low specific gravity which is prepared by feeding air through chewing gum materials which are being kneaded by applying the air through air supplying stirring rods in order to incorporate minute air bubbles into the texture thereof. In such a method, the quality control necessary to attain the final products of a desired fixed homogeneous texture is very difficult to obtain. With this method, mechanical transformations are imparted to the chewing gum and special devices are necessary therefor. With still other methods, the chewing gum is ground after a base is prepared by conventional processes, and known additives for the chewing gum, such as sweeteners, flavorings, colorings, etc., are applied. In some instances, the granules or powder is tabletted together with powder alcohol or powdered milk or cream into a multi-layered product. However, since the tabletting process is conducted at the final stage, it is difficult to obtain final products having lightweight, low specific gravity, and a soft chewing impression when chewed.

SUMMARY OF THE INVENTION

In accordance with the present invention, a chewing gum is provided which is formed by mixing a chewing gum base with the desired sweeteners, corn syrups, starches, flavorings or colorants in order to form a chewing gum composition which is thereafter refrigerated or cooled to a temperature below freezing up to about −15° C or lower. The refrigerated composition is then crushed or ground to obtain minute fragments of finely ground pieces of the composition and, thereafter, these fragments are heated or warmed to temperatures which cause them to adhere together and form an integrated body.

When conventional chewing gum composition which is prepared by conventional processes is refrigerated at temperatures around −15° C or lower, and preferably −20° C or lower, it can be finely crushed or ground to obtain minute fragments or finely ground pieces. When these minute fragments or pieces are leaved together with other powdery or massive materials as they are warmed or heated ambiently up to room temperature, an integrated body is formed due to the cross-linking or self-adhesion of the chewing gum matter and the integrated body incorporates therein minute air bubbles.

Either of the following methods can be employed to integrate the minute fragments or pieces of the mixture:

a. the refrigerated minute fragments or pieces may be warmed after an optional application of light pressure, if necessary by placing it in a mold or on a framed plate or by placing it on a conveyor belt or the like; or b. the minute particles may be coated over pieces of edible materials which form centers using a rotating coating device, such as a revolving pan or drum, and thereafter, the coated materials may be warmed.

By an extremely simple process, as described above, there are obtained chewing gum products having a lightweight, low specific gravity and a desired fixed homogeneous texture which exhibits a soft chewing impression when chewed.

Accordingly, it is an object of the invention to provide a chewing gum method of manufacture for forming chewing gum which is of lightweight, low specific gravity and gives a desired soft chewing impression when chewed.

A further object of the invention is to provide a chewing gum which is formed by cooling a chewing gum mixture to a temperature below −15° C and, thereafter, breaking the refrigerated material into small pieces which are subsequently permitted to warm and to become adhered together.

A further object of the invention is to provide a simple and inexpensive method for forming chewing gum.

DESCRIPTION OF THE PREFERRED EMBODIMENT

The process of the invention is described in detail as follows:

First, a chewing gum composition is prepared by appropriately kneading a chewing gum base which is obtained in a conventional manner with materials, such as sugar, glucose, corn syrup or the like and also with optional additives, such as flavorings, colorants and so on. The chewing gum composition is then cooled or refrigerated to a temperature below minus 15° C and, preferably, not higher than −20° C, at which temperature it is finely ground or crushed. Suitable temperatures for the crushing or grinding of the chewing gum composition are, in general, about −15° C or lower and preferably about −20° C or lower. The temperature depends upon the kinds and proportions of the components of the chewing gum base and the chewing gum composition. In a typical embodiment, the chewing gum composition is finely crushed or ground while refrigerating it to the above-described temperatures and by spraying thereon or by immersing it into a liquefied gas refrigerant, such as liquid carbon dioxide, liquid nitrogen, or similar material.

The chewing gum composition may also be refrigerated to a temperature lower than the temperatures mentioned above and using a high speed refrigerator or a band-type tunnel continuous refrigerator which uses ammonia or Freon (a trade mark of E.I. duPont de Nemours & Co. Inc.) or the like as a refrigerant. In this case, the crushing or grinding of the composition is carried out while maintaining it at a temperature within the above-mentioned temperature ranges. A hammer mill, crusher, pellitizer, turbomill or similar device may be used for the crushing or grinding.

The minute fragments or finely ground pieces are either premixed with powdery or massive materials, such as herbs, coffee, cocoa, nuts, candied fruits, candies or the like, and subjected to a subsequent step where they are warmed to the normal room temperature or they are warmed to normal room temperature directly and permitted to become self-adhered and integrated.

A typical arrangement for effecting the self-adhesion and integration comprises layering the minute fragments or pieces in a mold or on a framed plate or plate conveying belt or the like, and subsequently, allowing the fragments to stand either at normal room temperature or under forced draught at or above normal temperatures.

A typical detailed manufacturing process would be carried out as follows:

After a chewing gum composition is refrigerated to below −15° C or even lower, and it is crushed or ground to form minute particles, the minute fragments or finely ground pieces are warmed to room temperature from the refrigerated state and they become cross-linked or self-adhered together to form an integrated body which incorporates minute air bubbles in the texture between the particles. This provides a chewing gum product having a light, soft chewing impression when chewed.

When the fragments or finely ground pieces are molded in a mold or a framed plate, the final products with a desired appearance or shape are obtained. When using a plate, a conveying belt or similar apparatus on which the fragments or pieces are layered, the integrated products are cut with a knife or a similar sharp device, such as a lattice-shape cutter, a stamping cutter, circular blade cutter, etc. In order to ensure good unity of the products, if the fragments or pieces of the chewing gum composition are such that they do not adhere together, or adhere with other materials to be mixed therewith, they are appropriately applied with light pressure manually or mechanically before they are warmed to the normal room temperature to thereby promote the cross-linking or adhering of the chewing gum. This is, of course, an auxiliary step to improve the unity of the product and, in principle, the integration step is carried out merely by permitting the refrigerated fragments or pieces to warm to the normal room temperature and become adhered together. The resulting chewing gum product contains a sufficient quantity of minute air bubbles and has a desired fixed homogeneous and consistent texture.

A chewing gum product obtained by the process of the invention has a specific gravity of from 0.7 to 0.8 and this corresponds to about 50% to 70% with respect to that of conventional stick chewing gums which lies in a range of from 1.2 to 1.3. From the point of view of texture, in conventional chewing gums, such as stick or panned piece chewing gums, as well as those of the prior art processes, visco-elastic materials constitute a principal ingredient of the chewing gum base. Such a base comprises natural gums or resins, such as chicle or the like, or synthetic resins, such as polyvinyl acetate or similar materials, which are strongly combined together to form a net-like structure in the texture of the chewing gum. The structure of the inventive chewing gum, however, is such that the ground pieces adhere together through a visco-elastic adhesion on a point-to-point adhesion basis with air bubbles in between. As a consequence, the chewing gum of the invention, when chewed, gives initially a light, soft, less visco-elastic and crisp impression and, as the chewing proceeds, with attendant ingredient elution by the saliva and elevation of the temperature of the mouth, the chewing gum exhibits properties peculiar to chewing gums in general. Thus, they show a different chewing process from that found in existing chewing gum products as well as in those lightweight, low specific gravity products of the prior art methods.

The needle penetration of the chewing gum, according to the process of the invention, is 15.8 mm/5 sec., while that of the commercially available stick gum is 2.9 mm/5 sec. This proves that the chewing gum of the invention is softer than conventional chewing gums. The measurement of the needle penetration was conducted with the use of a penetrometer as described in the Japanese Industrial Standard (JIS). A 100 g weight is applied to a 1 mm diameter needle for the total load of 150 g acting on the specimen and the penetrated length of the needle into the gum during 5 seconds is measured at 20° C. In addition, a panel test was performed by a panel of 15 expert panelists in order to determine a significant difference in hardness between the chewing gum product by the typical process and that of the present invention in respect to a conventional type stick gum product. Scoring was made on the basis of the following criteria:

1 — Hard
2 — Slightly hard
3 — Moderate
4 — Slightly soft
5 — Soft

The results are set forth in the following table:

| Score | Number of Panelists (total 15) | |
|---|---|---|
| | Chewing gum of the present invention | Conventional stick gum substrate |
| 5 | 8 | 0 |
| 4 | 7 | 0 |
| 3 | 0 | 0 |
| 2 | 0 | 1 |
| 1 | 0 | 14 |

The above table indicates that all of the panelist judged the chewing gum of the typical embodiment of the present invention to be "slightly soft" or "soft", and judge the conventional stick gum product to be "slightly hard" or "hard", which is indicative of the significant differences in hardness.

The present invention may be produced by a modification of the basic process. One example of such a modification is a process as described in Example 3 herein to be set forth following, wherein a chewing gum powder, held at an appropriate low temperature, is sprinkled over and coated on a spherical jelly particle as a center and using a coating device, such as a revolving pan or the like. This is followed by a coating with a gum solution and powdered sugar, and then by warming to a normal room temperature to effect self-adhesion of the chewing gum matter and integration of the components. Candies, other chewing gum pieces, nuts, candied fruit pieces and the like can be substituted as centers for the spherical jelly particles. Chocolate and similar materials may also be used in place of, or in addition to the gum solution and the powdered sugar.

EXAMPLE 1

A chewing gum composition was prepared by kneading 220 g of a chewing gum base obtained in a conventional manner, together with 590 g of sugar, 70 g of glucose and 100 g of corn syrup. This chewing gum composition was cooled to a normal room temperature and cut into 10 mm cubes after rolling. The cubes were then ground at a temperature of about −15° C or even lower into a powder with the grain size of the order of all passing through a 325 mesh sieve. The powder was immediately layered into a mold of 2.5 cm long × 2.5 cm wide to 1 cm deep and then allowed to stand at 20° C for 2 hours to effect self-adhesion and integration. Thus, molded chewing gum of hexahedron shape was obtained by releasing from the mold of that shape.

EXAMPLE 2

A chewing gum powder was prepared in the same manner as in Example 1. 100 g of this chewing gum powder was mixed with 8 g of fragments of hard candy. The mixture was folled by the same self-adhesion and integration step as in Example 1. The molded chewing gum of hexahedron shape with fragments of hard candy therein was obtained by releasng the materials from the mold.

EXAMPLE 3

A chewing gum powder was prepared in the same manner as in Example 1. Jellies were molded into spherical particles of 2 g/particle in a room and kept at 10° C. 200 g of the chewing gum powder was sprinkled over the spherical jelly particles in a revolving pan to coat the same under temperatures kept below −10° C. After the coating was completed, 10 g of a gum solution prepared from corn syrup, sugar, gum arabic and water and 20 g of powdered sugar were sprinkled over the coated jelly particles and this process was repeated several times to assure uniform coating. The content of the mold was then emptied into a container and allowed to stand at 20° C for 10 hours to effect self-adhesion of the chewing gum matter and, consequently, integration. The chewing gum of a ball-shape with jellies as centers was obtained.

While a specific embodiment of the invention has been shown and described in detail to illustrate the application of the principles of the invention, it will be understood that the invention may be embodied otherwise without departing from such principles.

What is claimed is:

1. A process for the preparation of chewing gum, comprising mixing a chewing gum base with additives to produce a chewing gum composition of desired taste, color and flavor, cooling the chewing gum composition to temperatures below −15° C, forming the cooled chewing gum composition into minute fragments, and placing the minute fragments together in a pile and warming the fragments to cause them to become self-adhered together as they thaw and form an integrated chewing gum product with air spaces therebetween and without compressing them together so as to destroy the air spaces.

2. A process according to claim 1, including adding additional flavoring material to the minute fragments before permitting them to stand for a period of time to adhere together.

3. A process according to claim 2, wherein the material added to the minute fragments is selected from the group consisting of, herbs, coffee, cocoa, nuts, candied fruits, candies and mixtures thereof.

4. A process according to claim 1, wherein said minute fragments are formed by pulverizing the cooled composition and including adding the minute fragments into a mold before they are permitted to stand and become adhered together at room temperature.

5. A process according to claim 4, wherein said chewing gum composition is cooled by spraying thereon or directing it into a liquefied gas refrigerant.

6. A process according to claim 1, wherein the cooled chewing gum composition is pulverized by a pulverizer such as crusher, hammer mill, pelletizer or turbomill.

7. A process according to claim 1, wherein said additives are selected from the group consisting of sugar, glucose, corn syrup, flavorings, colorants and mixtures thereof.

8. A process for the preparation of chewing gum product, comprising mixing a chewing gum base with additives to produce a chewing gum composition of desired taste, color and flavor, cooling the chewing gum composition to temperatures below −15° C, forming the cooled chewing gum composition into minute fragments, coating a confection material with the cooled fragments, followed by coating with powdered sugar and gum solution, chocolate, or the like, and warming the resulting product to effect self-adhesion of the chewing gum matter.

9. A process according to claim 8, wherein said confection material is selected from the group consisting of candies, jellies, candied fruits and chewing gum pieces.

10. A process according to claim 8, wherein said minute fragments are formed by pulverizing the cooled composition.

11. A process according to claim 10, wherein said chewing gum composition is cooled by spraying thereon or directing it into a liquefied gas refrigerant.

12. A process according to claim 8, wherein the cooled chewing gum composition is ground by a pulverizer such as a crusher, hammer mill, pelletizer or turbomill.

13. A process according to claim 8, wherein said coating is carried out with a rotating coating device.

14. A process according to claim 8, wherein said coating is carried out in a rotating coating device which is a revolving pan or drum.

15. A chewing gum prepared by the process of claim 1.

16. A chewing gum product prepared by the process of claim 8.